United States Patent
Xiu et al.

(10) Patent No.: US 12,047,598 B2
(45) Date of Patent: Jul. 23, 2024

(54) MERGE MODE WITH MOTION VECTOR DIFFERENCES

(71) Applicant: BEIJING DAJIA INTERNET INFORMATION TECHNOLOGY CO., LTD., Beijing (CN)

(72) Inventors: Xiaoyu Xiu, Beijing (CN); Wei Chen, Beijing (CN); Yi-Wen Chen, Beijing (CN); Tsung-Chuan Ma, Beijing (CN); Hong-Jheng Jhu, Beijing (CN); Xianglin Wang, Beijing (CN); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 272 days.

(21) Appl. No.: 17/566,139

(22) Filed: Dec. 30, 2021

(65) Prior Publication Data
US 2022/0132159 A1   Apr. 28, 2022

Related U.S. Application Data

(63) Continuation of application No. PCT/US2021/022606, filed on Mar. 16, 2021.
(Continued)

(51) Int. Cl.
*H04N 19/52* (2014.01)
*H04N 19/132* (2014.01)
(Continued)

(52) U.S. Cl.
CPC .......... *H04N 19/52* (2014.11); *H04N 19/132* (2014.11); *H04N 19/139* (2014.11); *H04N 19/17* (2014.11);
(Continued)

(58) Field of Classification Search
CPC .... H04N 19/52; H04N 19/132; H04N 19/139; H04N 19/17; H04N 19/1887;
(Continued)

(56) References Cited

U.S. PATENT DOCUMENTS 10,448,025 B1    10/2019   Xu et al.
11,509,925 B2 *  11/2022   Jeong ................... H04N 19/119
(Continued)

FOREIGN PATENT DOCUMENTS

CN     103096065 A    5/2013
CN     109547790 A    3/2019
(Continued)

OTHER PUBLICATIONS

Beijingd Djia Internet Information Technology Co Ltd, International-Search-Report and Written Opinion PCTUS2021022606, Jul, 6, 2021, 9 pgs.
(Continued)

*Primary Examiner* — Joseph Suh
(74) *Attorney, Agent, or Firm* — Seed IP Law Group LLP

(57) ABSTRACT

An electronic apparatus performs a method of decoding video data. The method comprises: receiving, from a bitstream, a first control flag that indicates merge mode with motion vector difference (MMVD) is enabled for one or more coding units in a video sequence; receiving a first syntax from the video data that identifies a set of motion vector difference (MVD) offsets from a plurality sets of MVD offsets; receiving, a second control flag corresponding to a respective coding unit of the one or more coding units, which indicates the MMVD is applied to the coding unit; receiving a second syntax that selects an MVD offset from the identified set of MVD offsets, and a third syntax that selects an MVD direction; forming MVD based on the selected MVD offset and MVD direction; and reconstructing (Continued)

the coding unit by applying the formed MVD to generate motion vectors to the coding unit.

16 Claims, 11 Drawing Sheets

Related U.S. Application Data

(60) Provisional application No. 62/989,900, filed on Mar. 16, 2020.

(51) Int. Cl.
*H04N 19/139* (2014.01)
*H04N 19/169* (2014.01)
*H04N 19/17* (2014.01)
*H04N 19/70* (2014.01)

(52) U.S. Cl.
CPC ......... *H04N 19/1887* (2014.11); *H04N 19/70* (2014.11)

(58) Field of Classification Search
CPC .... H04N 19/70; H04N 19/137; H04N 19/172; H04N 19/119; H04N 19/176; H04N 19/105; H04N 19/184; H04N 19/11; H04N 19/13; H04N 19/146; H04N 19/186; H04N 19/42; H04N 19/513; H04N 19/593; H04N 19/91; H04N 19/96
See application file for complete search history.

(56) References Cited

U.S. PATENT DOCUMENTS

| | | | |
|---|---|---|---|
| 2008/0231483 A1 | 9/2008 | He et al. | |
| 2010/0124286 A1* | 5/2010 | Wang | H04N 19/91 375/E7.027 |
| 2018/0098089 A1 | 4/2018 | Chen et al. | |
| 2020/0077106 A1 | 3/2020 | Jhu et al. | |
| 2020/0112727 A1* | 4/2020 | Xu | H04N 19/593 |
| 2020/0169757 A1* | 5/2020 | Chiang | H04N 19/176 |

FOREIGN PATENT DOCUMENTS

| | | |
|---|---|---|
| CN | 110545424 A | 12/2019 |
| GB | 2585017 A | 6/2019 |
| GB | 2585018 A | 6/2019 |
| GB | 2585019 A | 6/2019 |
| WO | WO2019002615 A1 | 1/2019 |
| WO | WO 2019013434 A1 | 1/2019 |
| WO | WO2020017841 A1 | 1/2020 |
| WO | 2020/043061 A1 | 3/2020 |

OTHER PUBLICATIONS

Li Jingya, CE4-related: Improvement on ultimate motion vector expression, Joint Video Experts Team (JVET) of ITU-T SG 16 WP 3 and ISO/IEC JTC 1/SC 29/WG 11, Document: JVET-L0408-v2, 12th Meeting: Macao, CN, Oct. 3-12, 2018, 4 pgs.

Seungsoo Jeong, CE4-3.1: MMVD binarization, Joint Video Experts Team (JVET) of ITU-T SG 16 WP 3 and ISO/IEC JTC 1/SC 29/WG 11, Document: JVET-N0125, 14th Meeting: Geneva, CH, Mar. 19-27, 2019, 6 pgs.

Seungsoo Jeong, CE4-related: MMVD improvements, Joint Video Experts Team (JVET) of ITU-T SG 16 WP 3 and ISO/IEC JTC 1/SC 29/WG 11, Document: JVET-M0206, 13th Meeting: Marrakech, MA, Jan. 9-18, 2019, 4 pgs.

Benjamin Bross, Versatile Video Coding (Draft 8), Joint Video Experts Team (JVET) of ITU-T SG 16 WP 3 and ISO/IEC JTC 1/SC 29/WG 11, Document: JVET-Q2001, 17th Meeting, Brussels, BE, Jan. 7-17, 2020, 517 pgs.

Yan Zhan, CEA-related: Simplification on MMVD distance table, Joint Video Experts Team (JVET) of ITU-T SG 16 WP 3 and ISO/IEC JTC 1/SC 29WG 11, Document: JVET-N0449, 14th Meeting, Geneva, CH, Mar. 19-27, 2019, 3 pgs.

* cited by examiner

MERGE MODE WITH MOTION VECTOR DIFFERENCES

CROSS-REFERENCE TO RELATED APPLICATIONS

The present application is a continuation of International Application No. PCT/US2021/022606, entitled "IMPROVEMENTS ON MERGE MODE WITH MOTION VECTOR DIFFERENCES" filed Mar. 16, 2021, which claims priority to U.S. Provisional Patent Application No. 62/989,900, entitled "IMPROVEMENTS ON MERGE MODE WITH MOTION VECTOR DIFFERENCES" filed Mar. 16, 2020, both of which are incorporated by reference in their entirety.

TECHNICAL FIELD

The present application generally relates to video coding and compression, and more specifically, to methods and apparatus on improving the coding efficiency of merge mode with motion vector differences (MMVD), also known as ultimate motion vector expression (UMVE) mode.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression standards. Some well-known video coding standards include Versatile Video Coding (VVC), High Efficiency Video Coding (HEVC, also known as H.265 or MPEG-H Part 2) and Advanced Video Coding (AVC, also known as H.264 or MPEG-4 Part 10), which are jointly developed by ISO/IEC MPEG and ITU-T VECG. AOMedia Video 1 (AV1) was developed by Alliance for Open Media (AOM) as a successor to its preceding standard VP9. Audio Video Coding (AVS), which refers to digital audio and digital video compression standard, is another video compression standard series developed by the Audio and Video Coding Standard Workgroup of China.

Video compression typically includes performing spatial (intra frame) prediction and/or temporal (inter frame) prediction to reduce or remove redundancy inherent in the video data. For block-based video coding, a video frame is partitioned into one or more slices, each slice having multiple video blocks, which may also be referred to as coding tree units (CTUs). Each CTU may contain one coding unit (CU) or recursively split into smaller CUs until the predefined minimum CU size is reached. Each CU (also named leaf CU) contains one or multiple transform units (TUs) and each CU also contains one or multiple prediction units (PUs). Each CU can be coded in either intra, inter or IBC modes. Video blocks in an intra coded (I) slice of a video frame are encoded using spatial prediction with respect to reference samples in neighboring blocks within the same video frame. Video blocks in an inter coded (P or B) slice of a video frame may use spatial prediction with respect to reference samples in neighboring blocks within the same video frame or temporal prediction with respect to reference samples in other previous and/or future reference video frames.

Spatial or temporal prediction based on a reference block that has been previously encoded, e.g., a neighboring block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wirelessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

With digital video quality going from high definition, to 4K×2K or even 8K×4K, the amount of vide data to be encoded/decoded grows exponentially. It is a constant challenge in terms of how the video data can be encoded/decoded more efficiently while maintaining the image quality of the decoded video data.

SUMMARY

The present application describes implementations related to video data encoding and decoding and, more particularly, to methods and apparatus on improving the coding efficiency of merge mode with motion vector differences (MMVD), also known as ultimate motion vector expression (UMVE) mode.

According to a first aspect of the present application, a method of decoding video data includes receiving, from a bitstream, a first control flag, wherein the first control flag indicates whether merge mode with motion vector difference (MMVD) is enabled for one or more coding units in a video sequence; in accordance with a determination that the MMVD is enabled from the first control flag, receiving a first syntax element from the video data, wherein the first syntax element identifies a set of motion vector difference (MVD) offsets from a plurality sets of MVD offsets; receiving, from the bitstream, a second control flag for video data corresponding to a respective coding unit of the one or more coding units, which indicates whether the MMVD is applied to the respective coding unit; in accordance with a determination that the MMVD is applied to the respective coding unit from the second control flag, receiving a second syntax element for the respective coding unit that selects an MVD offset from the identified set of MVD offsets, and a third syntax element for the respective coding unit that selects an MVD direction corresponding to the selected MVD offset; forming MVD based on the selected MVD offset and MVD direction; and reconstructing the respective coding unit by applying the formed MVD to generate motion vectors to the respective coding unit.

According to a second aspect of the present application, a method of decoding video data includes receiving, from a bitstream, a first control flag, wherein the first control flag indicates whether merge mode with motion vector difference (MMVD) is enabled for one or more coding units; in accordance with a determination that the MMVD is enabled from the first control flag, receiving, from the bitstream, a second control flag for video data corresponding to a respective coding unit of the one or more coding units, which indicates whether the MMVD is applied to the respective coding unit; in accordance with a determination that the MMVD is applied to the respective coding unit from the second control flag, receiving a third control flag from the video data, wherein the third control flag indicates whether inter prediction filter (InterPF) mode is enabled for the respective coding unit; in accordance with a determination that the InterPF mode is enabled for the respective coding unit from the third control flag, receiving a fourth syntax element from the video data, wherein the fourth syntax element identifies an InterPF mode from a plurality of InterPF modes for the respective coding unit; and reconstructing the respective coding unit by applying the MMVD and the identified InterPF mode to the video data corresponding to the respective coding unit.

According to a third aspect of the present application, an electronic apparatus includes one or more processing units, memory and a plurality of programs stored in the memory. The programs, when executed by the one or more processing units, cause the electronic apparatus to perform the method of decoding video data as described above.

According to a fourth aspect of the present application, a non-transitory computer readable storage medium stores a plurality of programs for execution by an electronic apparatus having one or more processing units. The programs, when executed by the one or more processing units, cause the electronic apparatus to perform the method of decoding video data as described above.

BRIEF DESCRIPTION OF DRAWINGS

The accompanying drawings, which are included to provide a further understanding of the implementations and are incorporated herein and constitute a part of the specification, illustrate the described implementations and together with the description serve to explain the underlying principles. Like reference numerals refer to corresponding parts.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

The first generation AVS standard includes Chinese national standard "Information Technology, Advanced Audio Video Coding, Part 2: Video" (known as AVS1) and "Information Technology, Advanced Audio Video Coding Part 16: Radio Television Video" (known as AVS+). It can offer around 50% bit-rate saving at the same perceptual quality compared to MPEG-2 standard. The second generation AVS standard includes the series of Chinese national standard "Information Technology, Efficient Multimedia Coding" (knows as AVS2), which is mainly targeted at the transmission of extra HD TV programs. The coding efficiency of the AVS2 is double of that of the AVS+. Meanwhile, the AVS2 standard video part was submitted by Institute of Electrical and Electronics Engineers (IEEE) as one international standard for applications. The AVS3 standard is one new generation video coding standard for UHD video application aiming at surpassing the coding efficiency of the latest international standard HEVC, which provides approximately 30% bit-rate savings over the HEVC standard.

The focus of this disclosure is to improve the coding performance of the merge mode with motion vector differences (MMVD) tool that are used in both the VVC and the AVS3 standards. In the AVS3, the tool is called ultimate motion vector expression (UMVE). In some embodiments disclosed herein, while MMVD design in the AVS3 standard is used as an example to demonstrate the basic MMVD method, to a person skilled in the art of video coding, the methods described in the disclosure can also be applied to other MMVD designs or other coding tools with the same or similar design.

Figure 1:
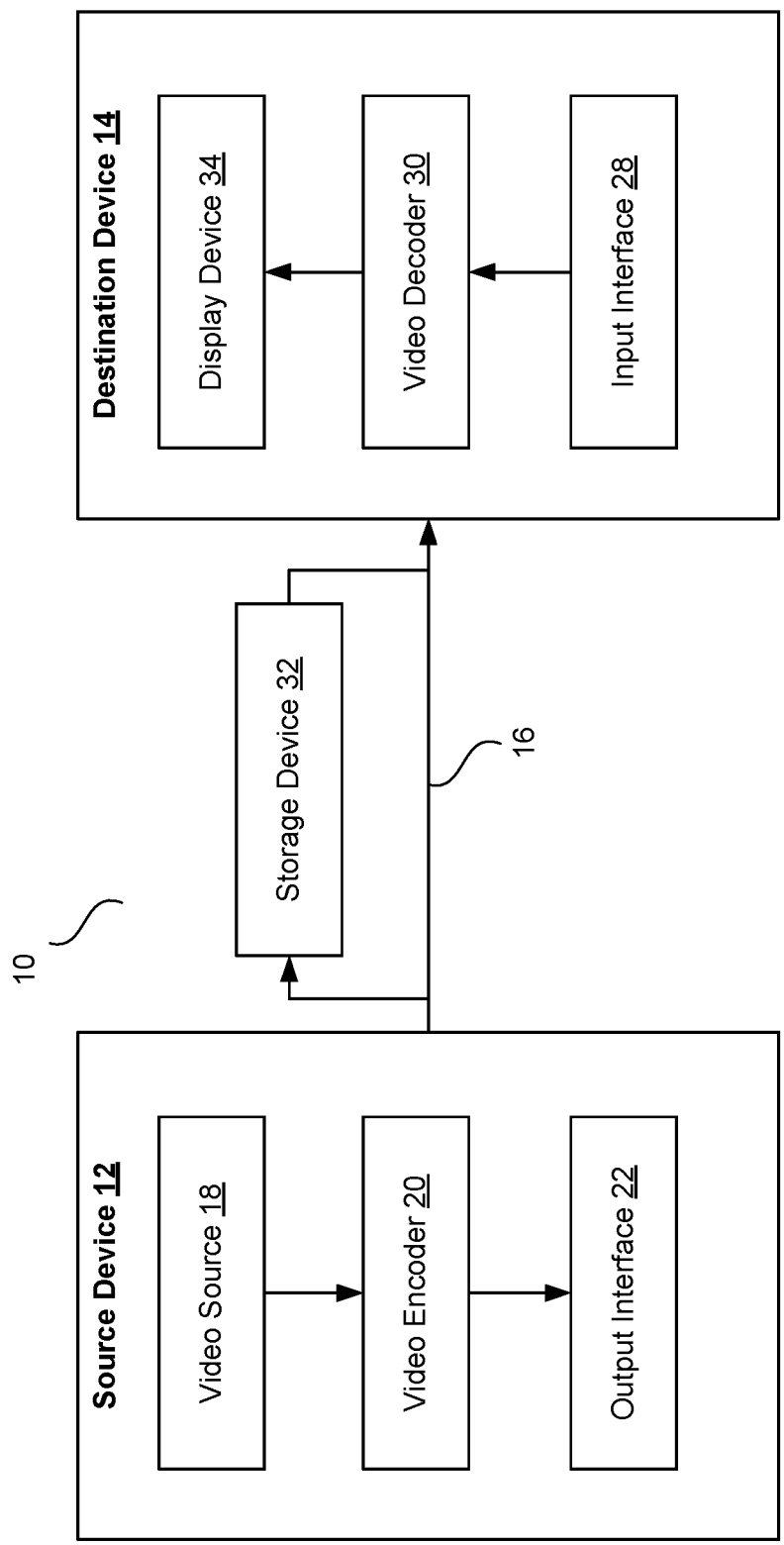
FIG. 1 is a block diagram illustrating an exemplary video encoding and decoding system in accordance with some implementations of the present disclosure.

FIG. 1 is a block diagram illustrating an exemplary system 10 for encoding and decoding video blocks in parallel in accordance with some implementations of the present disclosure. As shown in FIG. 1, system 10 includes a source device 12 that generates and encodes video data to be decoded at a later time by a destination device 14. Source device 12 and destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, source device 12 and destination device 14 are equipped with wireless communication capabilities.

In some implementations, destination device 14 may receive the encoded video data to be decoded via a link 16. Link 16 may comprise any type of communication medium or device capable of moving the encoded video data from source device 12 to destination device 14. In one example, link 16 may comprise a communication medium to enable source device 12 to transmit the encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some other implementations, the encoded video data may be transmitted from output interface 22 to a storage device 32. Subsequently, the encoded video data in storage device 32 may be accessed by destination device 14 via input interface 28. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video data generated by source device 12. Destination device 14 may access the stored video data from storage device 32 via streaming or downloading. The file server may be any type of computer capable of storing encoded video data and transmitting the encoded video data to destination device 14. Exemplary file servers include a web server (e.g., for a website), an FTP server, network attached storage (NAS) devices, or a local disk drive. Destination device 14 may access the encoded video data through any standard data connection, including a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

As shown in FIG. 1, source device 12 includes a video source 18, a video encoder 20 and an output interface 22. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera of a security surveillance system, source device 12 and destination device 14 may form camera phones or video phones. However, the implementations described in the present application may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback. Output interface 22 may further include a modem and/or a transmitter.

Destination device 14 includes an input interface 28, a video decoder 30, and a display device 34. Input interface 28 may include a receiver and/or a modem and receive the encoded video data over link 16. The encoded video data communicated over link 16, or provided on storage device 32, may include a variety of syntax elements generated by video encoder 20 for use by video decoder 30 in decoding the video data. Such syntax elements may be included within the encoded video data transmitted on a communication medium, stored on a storage medium, or stored a file server.

In some implementations, destination device 14 may include a display device 34, which can be an integrated display device and an external display device that is configured to communicate with destination device 14. Display device 34 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to proprietary or industry standards, such as VVC, HEVC, MPEG-4, Part 10, Advanced Video Coding (AVC), or extensions of such standards. It should be understood that the present application is not limited to a specific video coding/decoding standard and may be applicable to other video coding/decoding standards. It is generally contemplated that video encoder 20 of source device 12 may be configured to encode video data according to any of these current or future standards. Similarly, it is also generally contemplated that video decoder 30 of destination device 14 may be configured to decode video data according to any of these current or future standards.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video coding/decoding operations disclosed in the present disclosure. Each of video encoder 20 and video decoder 30 may be included in one or more encoders or decoders, either of which may be integrated as part of a combined encoder/decoder (CODEC) in a respective device.

Figure 2:
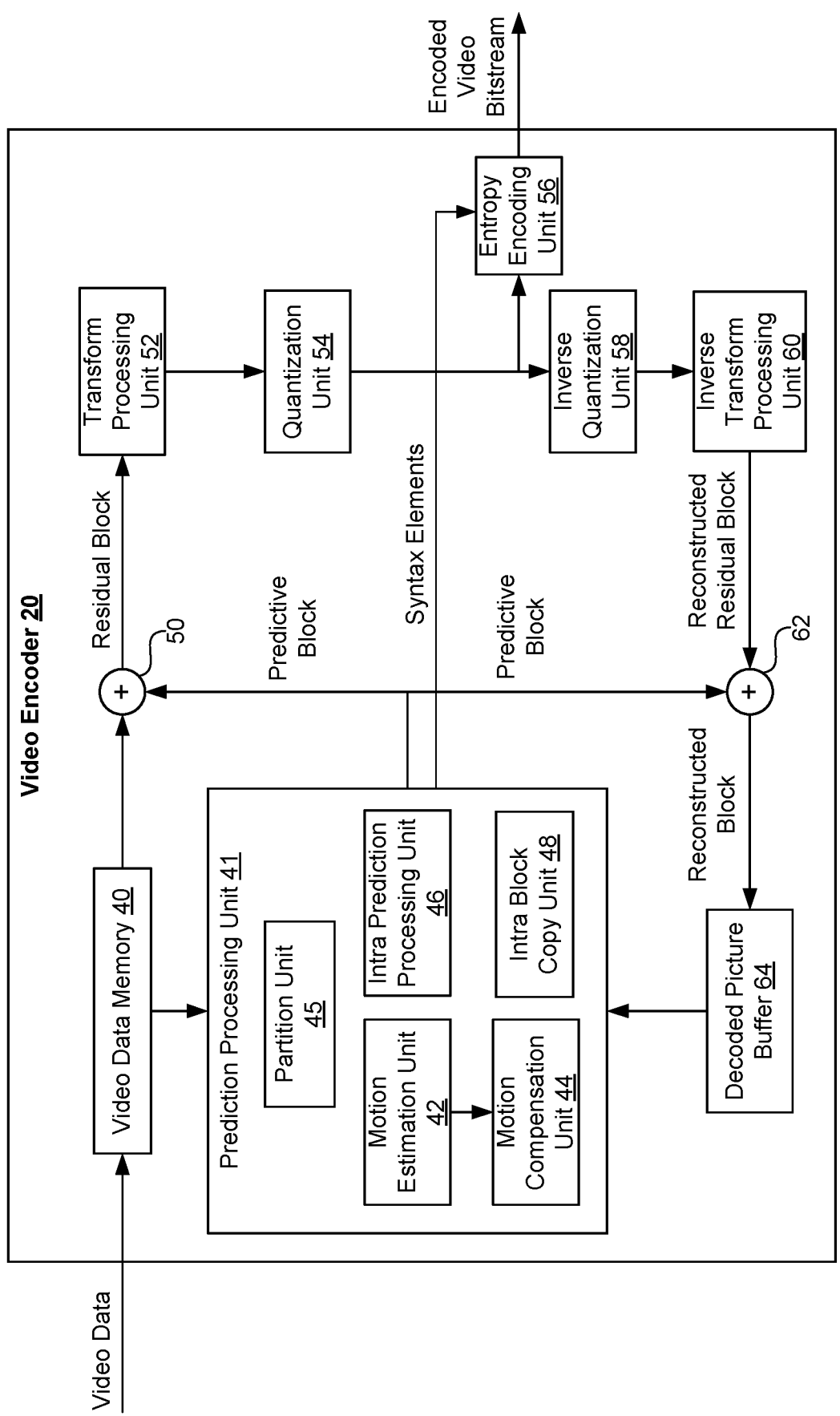
FIG. 2 is a block diagram illustrating an exemplary video encoder in accordance with some implementations of the present disclosure.

FIG. 2 is a block diagram illustrating an exemplary video encoder 20 in accordance with some implementations described in the present application. Video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence.

As shown in FIG. 2, video encoder 20 includes video data memory 40, prediction processing unit 41, decoded picture buffer (DPB) 64, summer 50, transform processing unit 52, quantization unit 54, and entropy encoding unit 56. Prediction processing unit 41 further includes motion estimation unit 42, motion compensation unit 44, partition unit 45, intra prediction processing unit 46, and intra block copy (BC) unit 48. In some implementations, video encoder 20 also includes inverse quantization unit 58, inverse transform processing unit 60, and summer 62 for video block reconstruction. A deblocking filter (not shown) may be positioned between summer 62 and DPB 64 to filter block boundaries to remove blockiness artifacts from reconstructed video. An in loop filter (not shown) may also be used in addition to the deblocking filter to filter the output of summer 62. Video encoder 20 may take the form of a fixed or programmable hardware unit or may be divided among one or more of the illustrated fixed or programmable hardware units.

Video data memory 40 may store video data to be encoded by the components of video encoder 20. The video data in video data memory 40 may be obtained, for example, from video source 18. DPB 64 is a buffer that stores reference video data for use in encoding video data by video encoder 20 (e.g., in intra or inter predictive coding modes). Video data memory 40 and DPB 64 may be formed by any of a variety of memory devices. In various examples, video data memory 40 may be on-chip with other components of video encoder 20, or off-chip relative to those components.

As shown in FIG. 2, after receiving video data, partition unit 45 within prediction processing unit 41 partitions the video data into video blocks. This partitioning may also include partitioning a video frame into slices, tiles, or other larger coding units (CUs) according to a predefined splitting structures such as quad-tree structure associated with the video data. The video frame may be divided into multiple video blocks (or sets of video blocks referred to as tiles). Prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). Prediction processing unit 41 may provide the resulting intra or inter prediction coded block to summer 50 to generate a residual block and to summer 62 to reconstruct the encoded block for use as part of a reference frame subsequently. Prediction processing unit 41 also provides syntax elements, such as motion vectors, intra-mode indicators, partition information, and other such syntax information, to entropy encoding unit 56.

In order to select an appropriate intra predictive coding mode for the current video block, intra prediction processing unit 46 within prediction processing unit 41 may perform intra predictive coding of the current video block relative to one or more neighboring blocks in the same frame as the current block to be coded to provide spatial prediction. Motion estimation unit 42 and motion compensation unit 44 within prediction processing unit 41 perform inter predictive coding of the current video block relative to one or more predictive blocks in one or more reference frames to provide temporal prediction. Video encoder 20 may perform multiple coding passes, e.g., to select an appropriate coding mode for each block of video data.

In some implementations, motion estimation unit 42 determines the inter prediction mode for a current video frame by generating a motion vector, which indicates the displacement of a prediction unit (PU) of a video block within the current video frame relative to a predictive block within a reference video frame, according to a predetermined pattern within a sequence of video frames. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). The predetermined pattern may designate video frames in the sequence as P frames or B frames. Intra BC unit 48 may determine vectors, e.g., block vectors, for intra BC coding in a manner similar to the determination of motion vectors by motion estimation unit 42 for inter prediction, or may utilize motion estimation unit 42 to determine the block vector.

A predictive block is a block of a reference frame that is deemed as closely matching the PU of the video block to be coded in terms of pixel difference, which may be determined by sum of absolute difference (SAD), sum of square difference (SSD), or other difference metrics. In some implementations, video encoder 20 may calculate values for sub-integer pixel positions of reference frames stored in DPB 64. For example, video encoder 20 may interpolate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter prediction coded frame by comparing the position of the PU to the position of a predictive block of a reference frame selected from a first reference frame list (List 0) or a second reference frame list (List 1), each of which identifies one or more reference frames stored in DPB 64. Motion estimation unit 42 sends the calculated motion vector to motion compensation unit 44 and then to entropy encoding unit 56.

Motion compensation, performed by motion compensation unit 44, may involve fetching or generating the predictive block based on the motion vector determined by motion estimation unit 42. Upon receiving the motion vector for the PU of the current video block, motion compensation unit 44 may locate a predictive block to which the motion vector points in one of the reference frame lists, retrieve the predictive block from DPB 64, and forward the predictive block to summer 50. Summer 50 then forms a residual video block of pixel difference values by subtracting pixel values of the predictive block provided by motion compensation unit 44 from the pixel values of the current video block being coded. The pixel difference values forming the residual vide block may include luma or chroma difference components or both. Motion compensation unit 44 may also generate syntax elements associated with the video blocks of a video frame for use by video decoder 30 in decoding the video blocks of the video frame. The syntax elements may include, for example, syntax elements defining the motion vector used to identify the predictive block, any flags indicating the prediction mode, or any other syntax information described herein. Note that motion estimation unit 42 and motion compensation unit 44 may be highly integrated, but are illustrated separately for conceptual purposes.

In some implementations, intra BC unit 48 may generate vectors and fetch predictive blocks in a manner similar to that described above in connection with motion estimation unit 42 and motion compensation unit 44, but with the predictive blocks being in the same frame as the current block being coded and with the vectors being referred to as block vectors as opposed to motion vectors. In particular, intra BC unit 48 may determine an intra-prediction mode to use to encode a current block. In some examples, intra BC unit 48 may encode a current block using various intra-prediction modes, e.g., during separate encoding passes, and test their performance through rate-distortion analysis. Next, intra BC unit 48 may select, among the various tested intra-prediction modes, an appropriate intra-prediction mode to use and generate an intra-mode indicator accordingly. For example, intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, intra BC unit 48 may use motion estimation unit 42 and motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by sum of absolute difference (SAD), sum of squared difference (SSD), or other difference metrics, and identification of the predictive block may include calculation of values for sub-integer pixel positions.

Whether the predictive block is from the same frame according to intra prediction, or a different frame according to inter prediction, video encoder 20 may form a residual video block by subtracting pixel values of the predictive block from the pixel values of the current video block being coded, forming pixel difference values. The pixel difference values forming the residual video block may include both luma and chroma component differences.

Intra prediction processing unit 46 may intra-predict a current video block, as an alternative to the inter-prediction performed by motion estimation unit 42 and motion compensation unit 44, or the intra block copy prediction performed by intra BC unit 48, as described above. In particular, intra prediction processing unit 46 may determine an intra prediction mode to use to encode a current block. To do so, intra prediction processing unit 46 may encode a current block using various intra prediction modes, e.g., during separate encoding passes, and intra prediction processing unit 46 (or a mode select unit, in some examples) may select an appropriate intra prediction mode to use from the tested intra prediction modes. Intra prediction processing unit 46 may provide information indicative of the selected intra-prediction mode for the block to entropy encoding unit 56. Entropy encoding unit 56 may encode the information indicating the selected intra-prediction mode in the bitstream.

After prediction processing unit 41 determines the predictive block for the current video block via either inter prediction or intra prediction, summer 50 forms a residual video block by subtracting the predictive block from the current video block. The residual video data in the residual block may be included in one or more transform units (TUs) and is provided to transform processing unit 52. Transform processing unit 52 transforms the residual video data into residual transform coefficients using a transform, such as a discrete cosine transform (DCT) or a conceptually similar transform.

Transform processing unit 52 may send the resulting transform coefficients to quantization unit 54. Quantization unit 54 quantizes the transform coefficients to further reduce bit rate. The quantization process may also reduce the bit depth associated with some or all of the coefficients. The degree of quantization may be modified by adjusting a quantization parameter. In some examples, quantization unit 54 may then perform a scan of a matrix including the quantized transform coefficients. Alternatively, entropy encoding unit 56 may perform the scan.

Following quantization, entropy encoding unit 56 entropy encodes the quantized transform coefficients into a video bitstream using, e.g., context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. The encoded bitstream may then be transmitted to video decoder 30, or archived in storage device 32 for later transmission to or retrieval by video decoder 30. Entropy encoding unit 56 may also entropy encode the motion vectors and the other syntax elements for the current video frame being coded.

Inverse quantization unit 58 and inverse transform processing unit 60 apply inverse quantization and inverse transformation, respectively, to reconstruct the residual video block in the pixel domain for generating a reference block for prediction of other video blocks. As noted above, motion compensation unit 44 may generate a motion compensated predictive block from one or more reference blocks of the frames stored in DPB 64. Motion compensation unit 44 may also apply one or more interpolation filters to the predictive block to calculate sub-integer pixel values for use in motion estimation.

Summer 62 adds the reconstructed residual block to the motion compensated predictive block produced by motion compensation unit 44 to produce a reference block for storage in DPB 64. The reference block may then be used by intra BC unit 48, motion estimation unit 42 and motion compensation unit 44 as a predictive block to inter predict another video block in a subsequent video frame.

Figure 3:
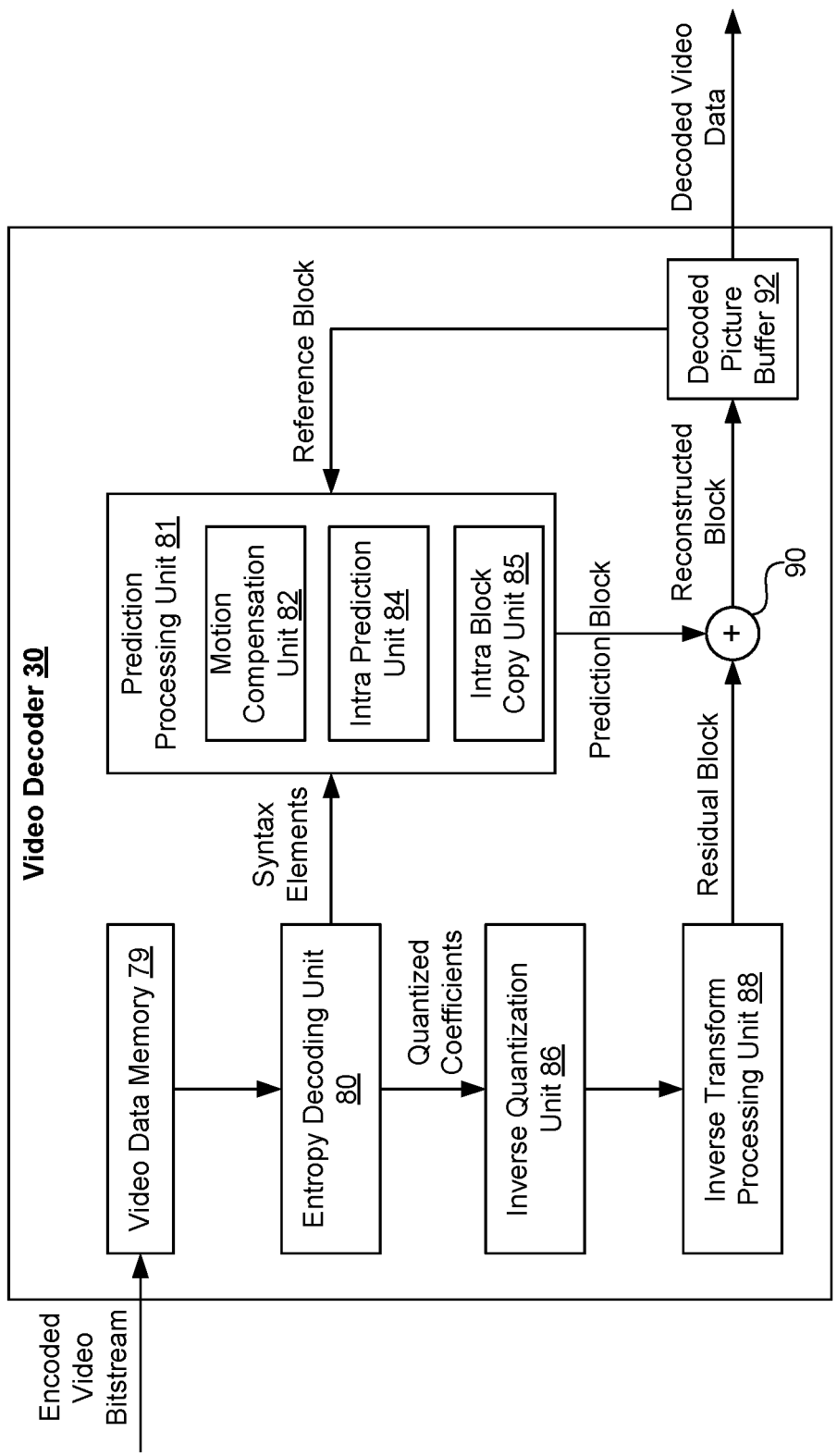
FIG. 3 is a block diagram illustrating an exemplary video decoder in accordance with some implementations of the present disclosure.

FIG. 3 is a block diagram illustrating an exemplary video decoder 30 in accordance with some implementations of the present application. Video decoder 30 includes video data memory 79, entropy decoding unit 80, prediction processing unit 81, inverse quantization unit 86, inverse transform processing unit 88, summer 90, and DPB 92. Prediction processing unit 81 further includes motion compensation unit 82, intra prediction unit 84, and intra BC unit 85. Video decoder 30 may perform a decoding process generally reciprocal to the encoding process described above with respect to video encoder 20 in connection with FIG. 2. For example, motion compensation unit 82 may generate prediction data based on motion vectors received from entropy decoding unit 80, while intra-prediction unit 84 may generate prediction data based on intra-prediction mode indicators received from entropy decoding unit 80.

In some examples, a unit of video decoder 30 may be tasked to perform the implementations of the present application. Also, in some examples, the implementations of the present disclosure may be divided among one or more of the units of video decoder 30. For example, intra BC unit 85 may perform the implementations of the present application, alone, or in combination with other units of video decoder 30, such as motion compensation unit 82, intra prediction unit 84, and entropy decoding unit 80. In some examples, video decoder 30 may not include intra BC unit 85 and the functionality of intra BC unit 85 may be performed by other components of prediction processing unit 81, such as motion compensation unit 82.

Video data memory 79 may store video data, such as an encoded video bitstream, to be decoded by the other components of video decoder 30. The video data stored in video data memory 79 may be obtained, for example, from storage device 32, from a local video source, such as a camera, via wired or wireless network communication of video data, or by accessing physical data storage media (e.g., a flash drive or hard disk). Video data memory 79 may include a coded picture buffer (CPB) that stores encoded video data from an encoded video bitstream. Decoded picture buffer (DPB) 92 of video decoder 30 stores reference video data for use in decoding video data by video decoder 30 (e.g., in intra or inter predictive coding modes). Video data memory 79 and DPB 92 may be formed by any of a variety of memory devices, such as dynamic random access memory (DRAM), including synchronous DRAM (SDRAM), magneto-resistive RAM (MRAM), resistive RAM (RRAM), or other types of memory devices. For illustrative purpose, video data memory 79 and DPB 92 are depicted as two distinct components of video decoder 30 in FIG. 3. But it will be apparent to one skilled in the art that video data memory 79 and DPB 92 may be provided by the same memory device or separate memory devices. In some examples, video data memory 79 may be on-chip with other components of video decoder 30, or off-chip relative to those components.

During the decoding process, video decoder 30 receives an encoded video bitstream that represents video blocks of an encoded video frame and associated syntax elements. Video decoder 30 may receive the syntax elements at the video frame level and/or the video block level. Entropy decoding unit 80 of video decoder 30 entropy decodes the bitstream to generate quantized coefficients, motion vectors or intra-prediction mode indicators, and other syntax elements. Entropy decoding unit 80 then forwards the motion vectors and other syntax elements to prediction processing unit 81.

When the video frame is coded as an intra predictive coded (I) frame or for intra coded predictive blocks in other types of frames, intra prediction unit 84 of prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, motion compensation unit 82 of prediction processing unit 81 produces one or more predictive blocks for a video block of the current video frame based on the motion vectors and other syntax elements received from entropy decoding unit 80. Each of the predictive blocks may be produced from a reference frame within one of the reference frame lists. Video decoder 30 may construct the reference frame lists, List 0 and List 1, using default construction techniques based on reference frames stored in DPB 92.

In some examples, when the video block is coded according to the intra BC mode described herein, intra BC unit 85 of prediction processing unit 81 produces predictive blocks for the current video block based on block vectors and other syntax elements received from entropy decoding unit 80. The predictive blocks may be within a reconstructed region of the same picture as the current video block defined by video encoder 20.

Motion compensation unit 82 and/or intra BC unit 85 determines prediction information for a video block of the current video frame by parsing the motion vectors and other syntax elements, and then uses the prediction information to produce the predictive blocks for the current video block being decoded. For example, motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, intra BC unit 85 may use some of the received syntax elements, e.g., a flag, to determine that the current video block was predicted using the intra BC mode, construction information of which video blocks of the frame are within the reconstructed region and should be stored in DPB 92, block vectors for each intra BC predicted video block of the frame, intra BC prediction status for each intra BC predicted video block of the frame, and other information to decode the video blocks in the current video frame.

Motion compensation unit 82 may also perform interpolation using the interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes the quantized transform coefficients provided in the bitstream and entropy decoded by entropy decoding unit 80 using the same quantization parameter calculated by video encoder 20 for each video block in the video frame to determine a degree of quantization. Inverse transform processing unit 88 applies an inverse transform, e.g., an inverse DCT, an inverse integer transform, or a conceptually similar inverse transform process, to the transform coefficients in order to reconstruct the residual blocks in the pixel domain.

After motion compensation unit 82 or intra BC unit 85 generates the predictive block for the current video block based on the vectors and other syntax elements, summer 90 reconstructs decoded video block for the current video block by summing the residual block from inverse transform processing unit 88 and a corresponding predictive block generated by motion compensation unit 82 and intra BC unit 85. An in-loop filter (not pictured) may be positioned between summer 90 and DPB 92 to further process the decoded video block. The decoded video blocks in a given frame are then stored in DPB 92, which stores reference frames used for subsequent motion compensation of next video blocks. DPB 92, or a memory device separate from DPB 92, may also store decoded video for later presentation on a display device, such as display device 34 of FIG. 1.

In a typical video coding process, a video sequence typically includes an ordered set of frames or pictures. Each frame may include three sample arrays, denoted SL, SCb, and SCr. SL is a two-dimensional array of luma samples.

SCb is a two-dimensional array of Cb chroma samples. SCr is a two-dimensional array of Cr chroma samples. In other instances, a frame may be monochrome and therefore includes only one two-dimensional array of luma samples.

Figure 4A:
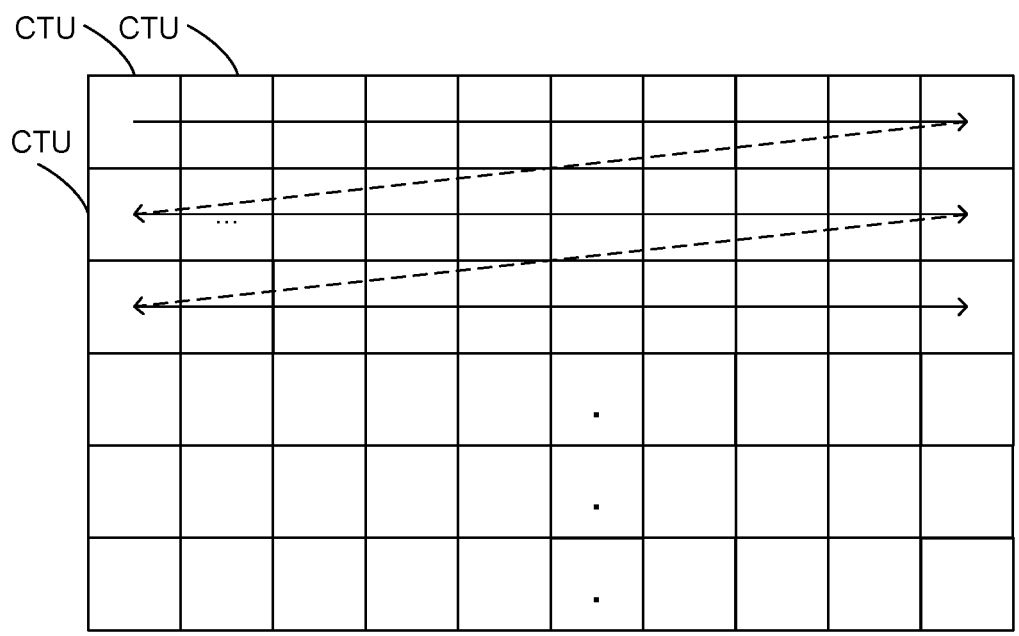
FIGS. 4A through 4E are block diagrams illustrating how a frame is recursively partitioned into multiple video blocks of different sizes and shapes in accordance with some implementations of the present disclosure.
Figure 4B:
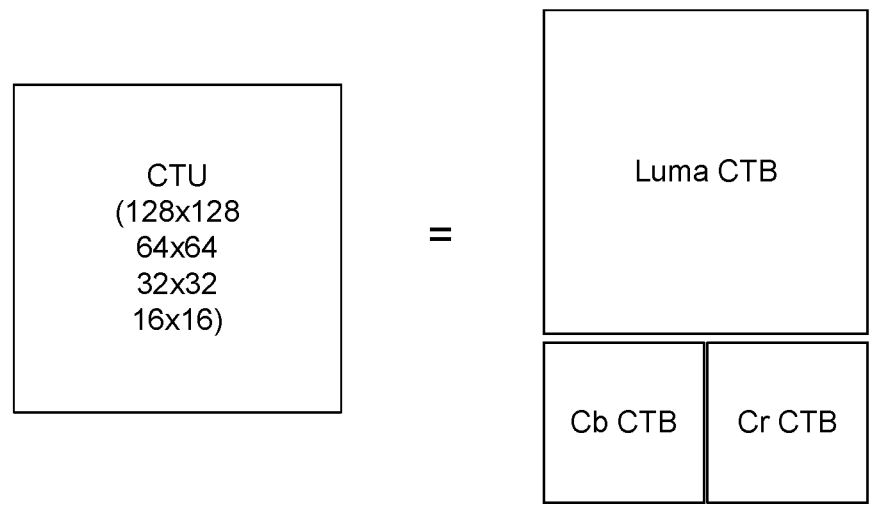

As shown in FIG. 4A, video encoder 20 (or more specifically partition unit 45) generates an encoded representation of a frame by first partitioning the frame into a set of coding tree units (CTUs). A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one coding tree block (CTB) of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
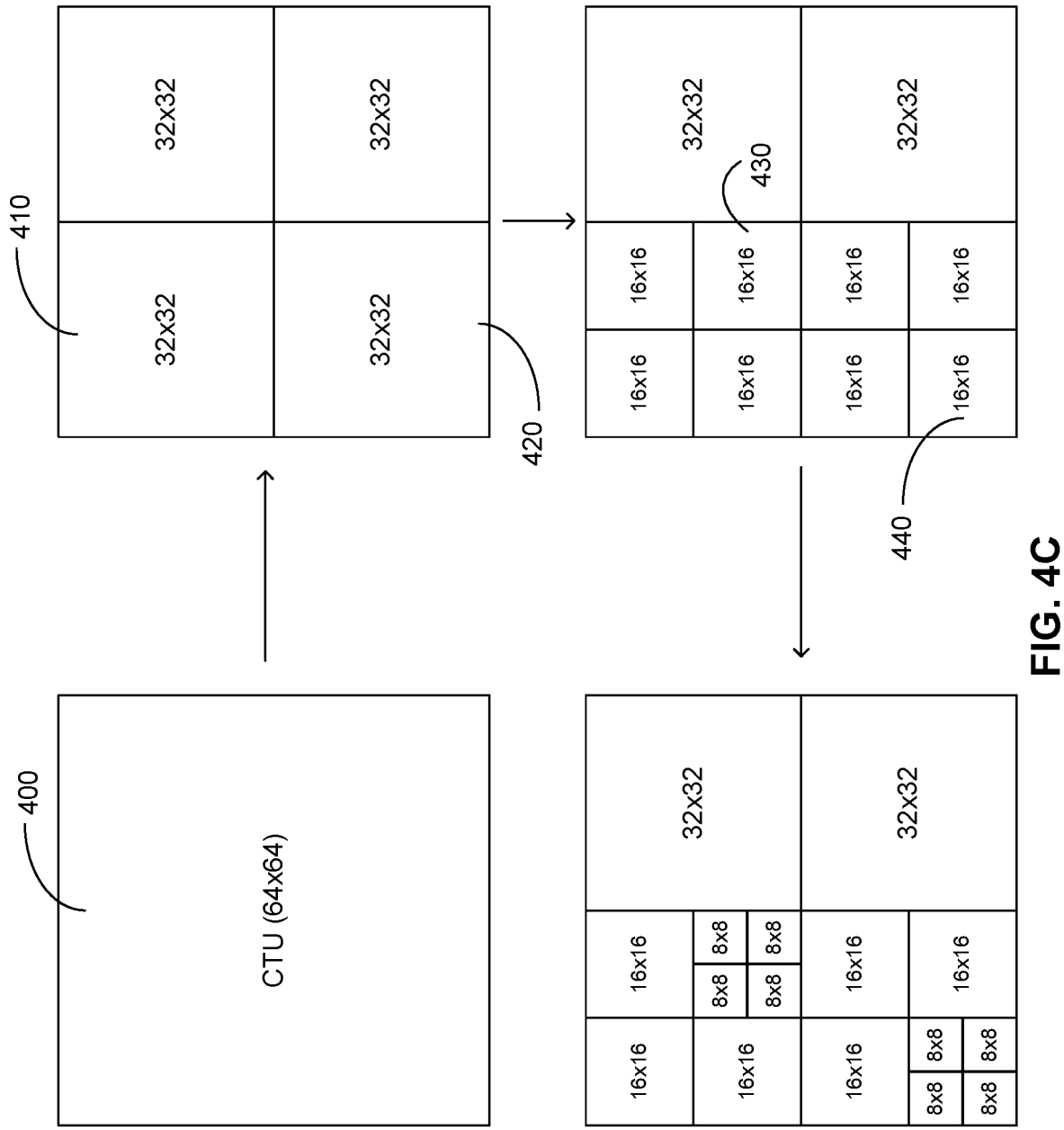
Figure 4D:
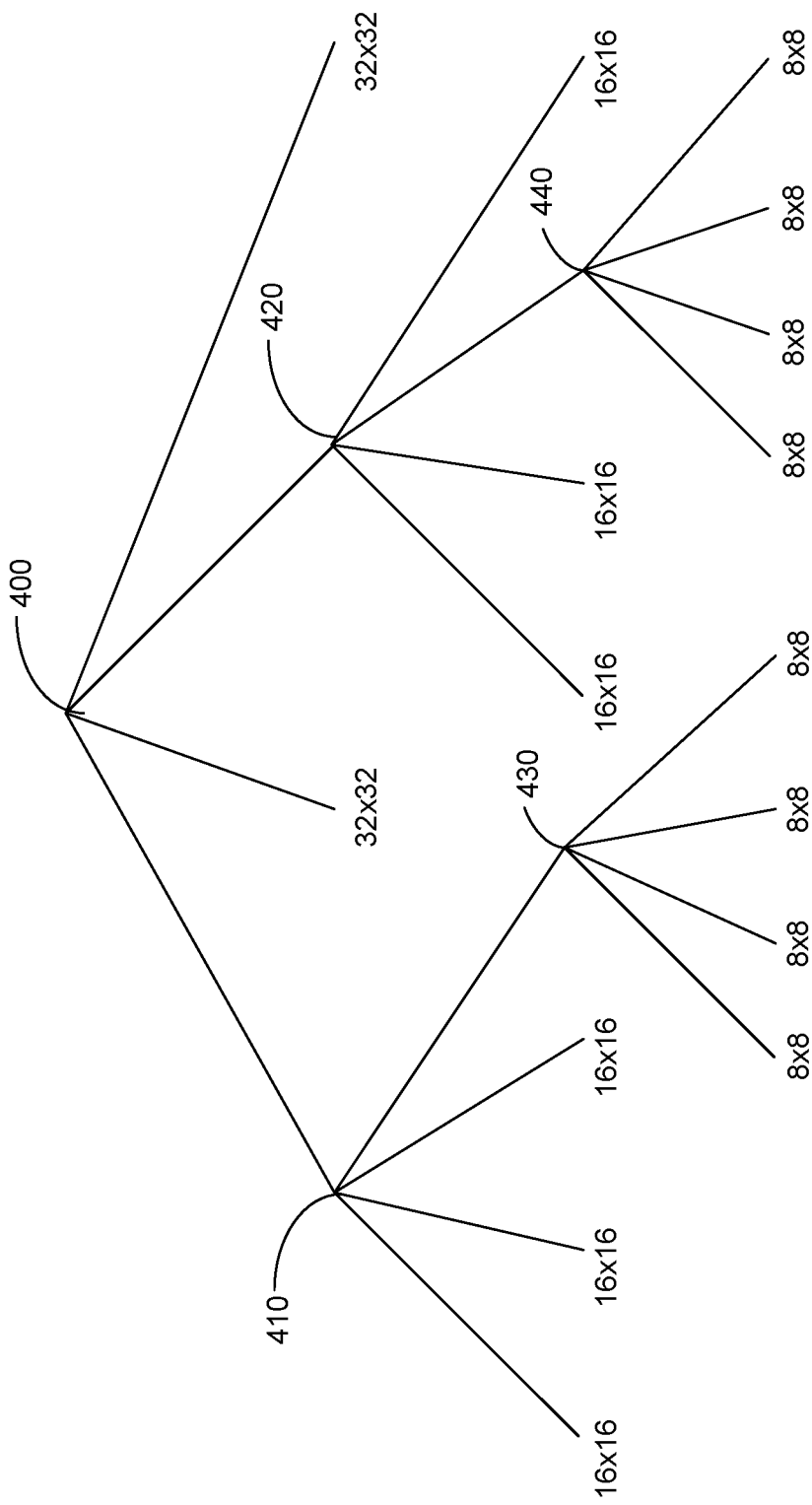
Figure 4E:
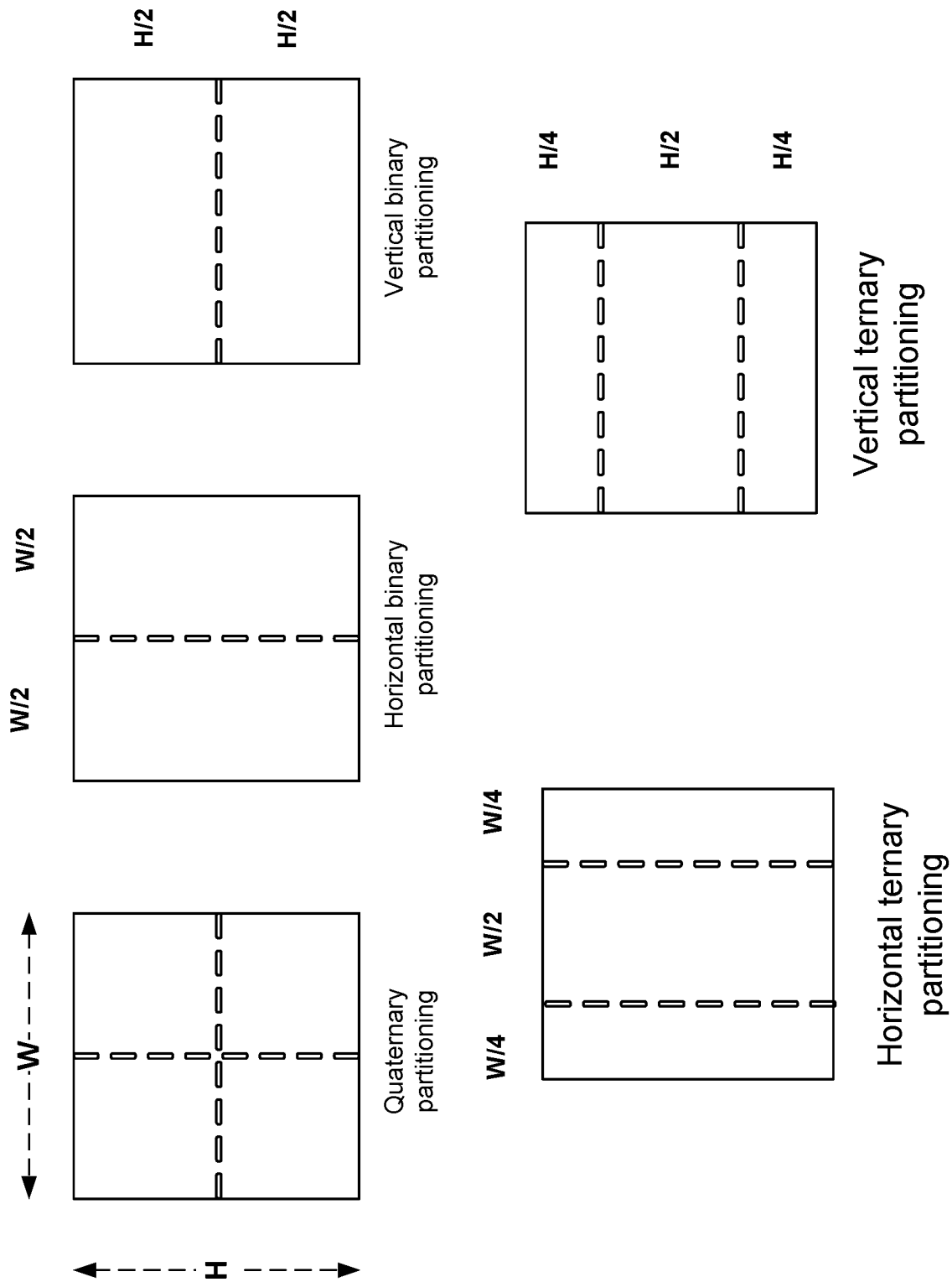

To achieve a better performance, video encoder 20 may recursively perform tree partitioning such as binary-tree partitioning, ternary-tree partitioning, quad-tree partitioning or a combination of both on the coding tree blocks of the CTU and divide the CTU into smaller coding units (CUs). As depicted in FIG. 4C, the 64×64 CTU 400 is first divided into four smaller CU, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a coding block (CB) of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are five partitioning types, i.e., quaternary partitioning, horizontal binary partitioning, vertical binary partitioning, horizontal ternary partitioning, and vertical ternary partitioning.

In some implementations, video encoder 20 may further partition a coding block of a CU into one or more M×N prediction blocks (PB). A prediction block is a rectangular (square or non-square) block of samples on which the same prediction, inter or intra, is applied. A prediction unit (PU) of a CU may comprise a prediction block of luma samples, two corresponding prediction blocks of chroma samples, and syntax elements used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the frame associated with the PU. If video encoder 20 uses inter prediction to generate the predictive blocks of a PU, video encoder 20 may generate the predictive blocks of the PU based on decoded samples of one or more frames other than the frame associated with the PU.

After video encoder 20 generates predictive luma, Cb, and Cr blocks for one or more PUs of a CU, video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, video encoder 20 may use quad-tree partitioning to decompose the luma, Cb, and Cr residual blocks of a CU into one or more luma, Cb, and Cr transform blocks. A transform block is a rectangular (square or non-square) block of samples on which the same transform is applied. A transform unit (TU) of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Finally, video encoder 20 may output a bitstream that includes a sequence of bits that forms a representation of coded frames and associated data, which is either saved in storage device 32 or transmitted to destination device 14.

After receiving a bitstream generated by video encoder 20, video decoder 30 may parse the bitstream to obtain syntax elements from the bitstream. Video decoder 30 may reconstruct the frames of the video data based at least in part on the syntax elements obtained from the bitstream. The process of reconstructing the video data is generally reciprocal to the encoding process performed by video encoder 20. For example, video decoder 30 may perform inverse transforms on the coefficient blocks associated with TUs of a current CU to reconstruct residual blocks associated with the TUs of the current CU. Video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

In some embodiments, there are different ways of signaling prediction modes. In VVC, each CU could be coded as skip mode or non-skip mode. For a CU coded as non-skip mode, syntax elements are further signaled to indicate if the current CU is coded as intra mode, inter mode, intra block copy (IBC) mode or palette (PLT) mode. These modes are termed as "MODE_INTRA", "MODE_INTER", "MODE_IBC" and "MODE_PLT" respectively in the VVC specification. For a CU coded as inter mode, the prediction signal can be generated by the pixels from the reference pictures which are not the current picture. Moreover, one flag is further signaled for a CU coded as inter mode to indicate whether current CU is merge mode. For a merge mode coded CU, several different types of merge modes are further signaled using additional syntax elements. These different types of merge modes including regular merge modes, subblock merge modes, merge mode with MV difference (MMVD), combined inter and intra prediction (CIIP) and triangle merge mode. There merge modes are illustrated in the following sections.

In some embodiments, in VVC, the merge candidate list is constructed by including the following five types of candidates in order: Spatial MVP (i.e. motion vector predictor) from spatial neighbour CUs, Temporal MVP from collocated CUs, History-based MVP from a FIFO table, Pairwise average MVP, and Zero MVs.

The size of merge list is signaled in slice header and the maximum allowed size of merge list is 6 in VVC. For each CU code in merge mode, an index of best merge candidate is encoded using truncated unary binarization (TU). The first bin of the merge index is coded with context and bypass coding is used for other bins. In the following context of this disclosure, this extended merge mode is also called regular merge mode since its concept is the same as the merge mode used in HEVC.

In some embodiments, in addition to merge mode which derives the motion information of one current block from its spatial/temporal neighbors, the MMVD/UMVE mode is introduced in both the VVC and AVS standards as one special merge mode. Specifically, in both the VVC and AVS3, the mode is signaled by one MMVD flag at coding block level. In the MMVD mode, the first two candidates in the merge list for regular merge mode are selected as the two base merge candidates for MMVD. After one base merge candidate is selected and signaled, additional syntax elements are signaled to indicate the motion vector differences (MVDs) that are added to the motion of the selected merge candidate. The MMVD syntax elements include a merge candidate flag to select the base merge candidate, a distance index to specify the MVD magnitude and a direction index to indicate the MVD direction.

Figure 5B:
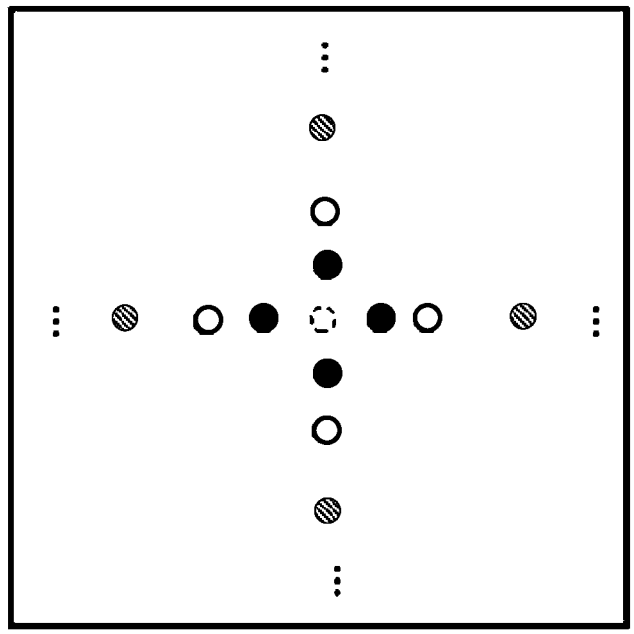
FIGS. 5A and 5B are block diagrams illustrating exemplary offsets added to either the horizontal or vertical component of the starting motion vector (MV) in accordance with some implementations of the present disclosure.
Figure 5A:
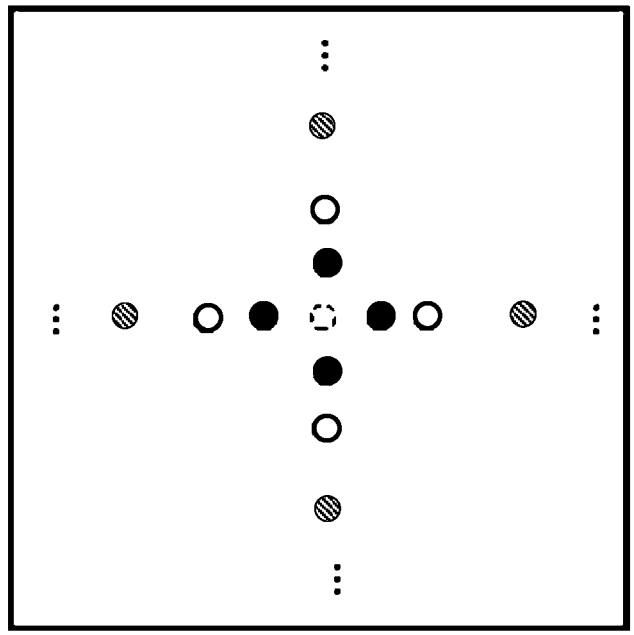

In the MMVD design, the distance index specifies MVD magnitude which is defined based on one set of pre-defined offsets from the starting point. FIGS. 5A and 5B are block diagrams illustrating exemplary offsets added to either horizontal or vertical component of the starting motion vector (MV) (i.e., the MVs of the selected base merge candidate) in accordance with some implementations of the present disclosure. The reference picture list L0 and reference picture list L1 are illustrated.

Table 1 illustrates the relation of distance index and pre-defined MVD offset that are applied.

TABLE 1

| The relation of distance index and pre-defined MVD offset | | | | | |
| --- | --- | --- | --- | --- | --- |
| Distance IDX | 0 | 1 | 2 | 3 | 4 |
| Offset (in unit of luma sample) | ¼ | ½ | 1 | 2 | 4 |

Direction index represents the direction of the MVD relative to the starting point. The direction index can represent of the four directions as shown in Table 2. It's noted that the meaning of MVD sign could be variant according to the information of starting MVs. When the starting MVs is an un-prediction MV or bi-prediction MVs with both lists point to the same side of the current picture (i.e., Picture Order Counts (POCs) of two references are both larger than the POC of the current picture, or are both smaller than the POC of the current picture), the sign in Table 2 specifies the sign of MV offset added to the starting MV. When the starting MVs is bi-prediction MVs with the two MVs point to the different sides of the current picture (i.e. the Picture Order Count (POC) of one reference is larger than the POC of the current picture, and the POC of the other reference is smaller than the POC of the current picture), the sign in Table 2 specifies the sign of MVD added to the list0 (L0 reference) MV component of starting MV and the sign for the list1 (L1 reference) MVD has opposite value.

TABLE 2

| Sign of MVD specified by direction index | | | | |
| --- | --- | --- | --- | --- |
| Direction IDX | 00 | 01 | 10 | 11 |
| x-axis | + | − | N/A | N/A |
| y-axis | N/A | N/A | + | − |

In some embodiments, to increase the accuracy of the MVs of the regular merge mode, a bilateral-matching based decoder side motion vector refinement (DMVR) is applied.

Figure 6:
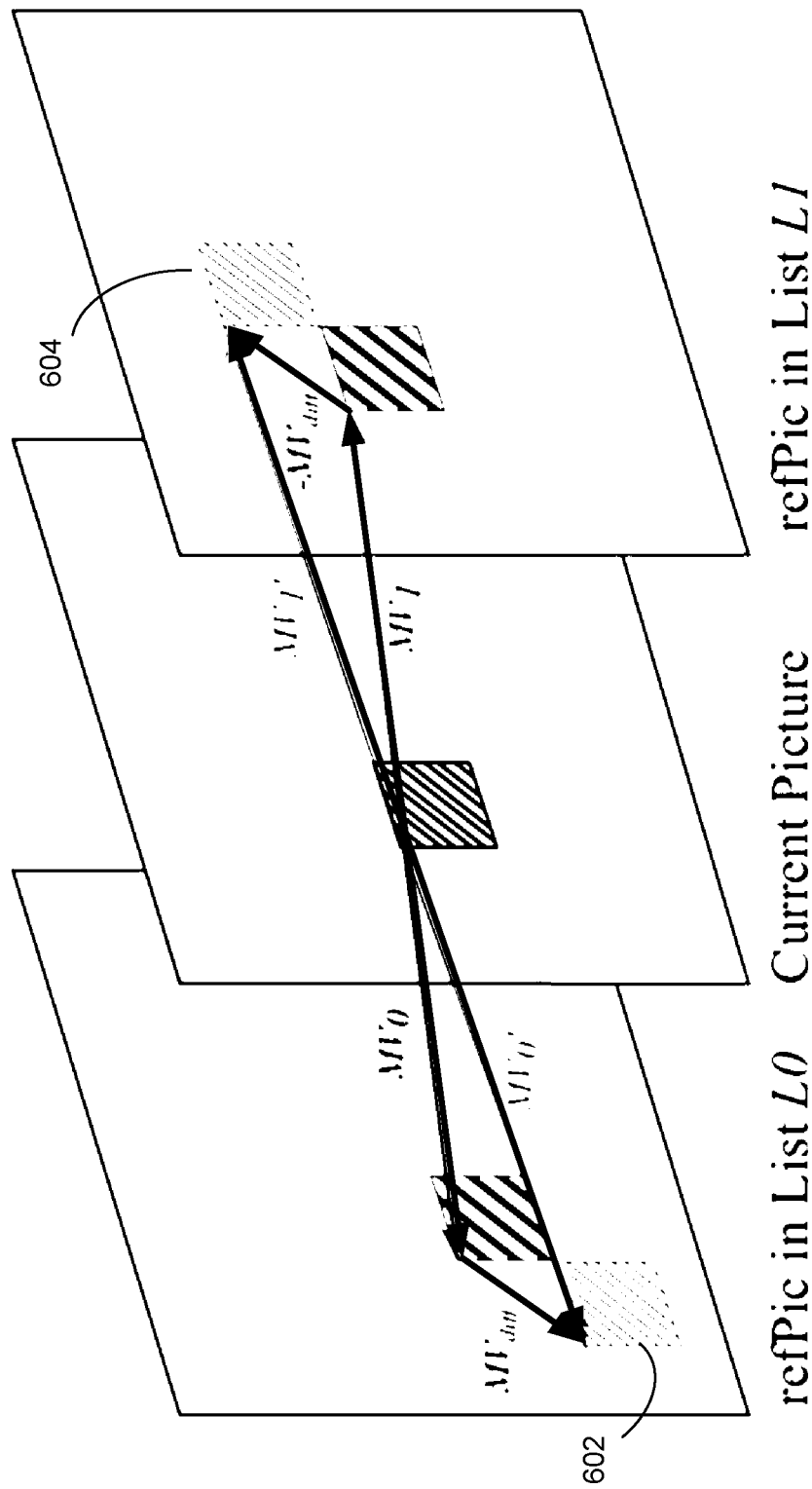
FIG. 6 is a block diagram illustrating an exemplary decoder side motion vector refinement (DMVR) mode in accordance with some implementations of the present disclosure.

In the bi-prediction operation, a refined MV is searched around the initial MVs in the reference picture list L0 and reference picture list L1. The method calculates the distortion between the two candidate blocks in the reference picture list L0 and list L1. FIG. 6 is a block diagram illustrating an exemplary decoder side motion vector refinement (DMVR) mode in accordance with some implementations of the present disclosure. As illustrated in FIG. 6, the SAD between the blocks 602 and 604 based on each MV candidate around the initial MV is calculated. The MV candidate with the lowest SAD becomes the refined MV and is used to generate the bi-predicted signal.

In DVMR, the search points are surrounding integer sample pointed by the initial MV and the MV offsets that are considered conform to the mirroring rule. In other words, any MV refinement that is checked by DMVR should satisfy the following two equations:

$$MV0'=MV0+MV\_offset \quad (1)$$

$$MV1'=MV1-MV\_offset \quad (2)$$

where MV_offset represents the refinement offset between the initial MV and the refined MV in one of the reference pictures. The refinement search range is two integer luma samples from the initial MV. The searching includes the integer sample search stage and fractional sample refinement stage.

Figure 7:
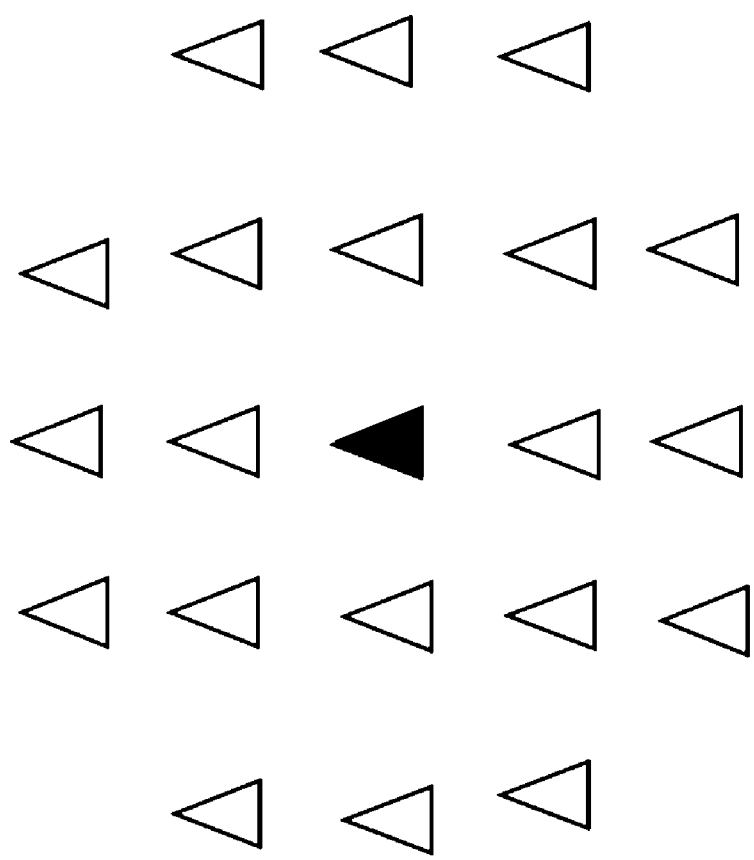
FIG. 7 is a block diagram illustrating some exemplary integer searching candidates for the DMVR mode in accordance with some implementations of the present disclosure.

In some embodiments, at the stage of integer sample search, the SAD of 21 integer sample positions (including the integer sample position corresponding to the initial MV) as indicated in FIG. 7 are checked. FIG. 7 is a block diagram illustrating some exemplary integer searching candidates for the DMVR mode in accordance with some implementations of the present disclosure. In FIG. 7, the black central triangle is the integer sample position associated with the initial MV and the white triangles are the neighboring integer sample positions. The SAD of the initial MV pair is first calculated. The integer offset which minimizes the SAD value is selected as the integer sample offset from the integer sample searching stage.

The integer sample search is followed by a fractional sample refinement. To save the computational complexity, the fractional sample refinement is derived by using parametric error surface method, instead of additional search with SAD comparison. In the parametric error surface based sub-pixel offsets estimation, the center position cost and the costs at four neighboring positions from the center are used to fit a 2-D parabolic error surface equation as follows:

$$E(x,y)=A(x-x_{min})^2+B(y-y_{min})^2+C \quad (3)$$

where $(x_{min}, y_{min})$ corresponds to the fractional position with the least cost and C corresponds to the minimum cost value. By solving the above equations by using the cost value of the five search points, the $(x_{min}, y_{min})$ is computed as:

$$x_{min}=(E(-1,0)-E(1,0))/(2(E(-1,0)+E(1,0)-2E(0,0))) \quad (4)$$

$$y_{min}=(E(0,-1)-E(0,1))/(2((E(0,-1)+E(0,1)-2E(0,0))) \quad (5)$$

The value of $x_{min}$ and $y_{min}$ are automatically constrained to be between −8 and 8 since all cost values are positive and the smallest value is E(0,0). The computed fractional $(x_{min}, y_{min})$ are added to the integer distance refinement MV to get the sub-pixel accuracy refinement delta MV.

In some embodiments, to further improve the prediction efficiency, inter prediction filter (InterPF) which combines the intra prediction and the merge mode based inter prediction of one CU is applied. Specifically, for each merge CU, one additional flag is signaled to indicate whether the InterPF mode is enabled for the current CU or not. When the flag is false, the InterPF is disabled and the regular inter prediction is applied to generate the prediction samples of the current CU. When the first flag is true, the InterPF is applied to the current CU and another flag is signaled to further indicate which one of the two InterPF modes is used. The two InterPF modes are described as follows:

InterPF Mode One: the combined prediction samples are derived as the weighted average of the inter prediction samples and five neighboring reconstructed samples from left, right, above, and below, as shown in the following equation set (6):

$$Pred(x,y)=(Pred\_inter(x,y)*5+Pred\_Q(x,y)*3)>>3$$

$$Pred\_Q(x,y)=(Pred\_V(x,y)+Pred\_H(x,y)+1)>>2$$

$$Pred\_V(x,y)=((h-1-y)*Rec(x,-1)+(y+1)*Rec(-1,h)+ (h>>1))>>\log 2(h)$$

$$Pred\_H(x,y)=((w-1-x)*Rec(-1,y)+(x+1)*Rec(w,-1)+ (w>>1))>>\log 2(w)$$

InterPF Mode Two: the combined prediction samples are derived as the weighted average of the inter prediction samples and three neighboring reconstructed samples from left, and above:

$$P'(x,y)=f(x)\cdot P(-1,y)+f(y)\cdot P(x,-1)+(1-f(x)-f(y))\cdot P(x,y) \quad (7)$$

In (7), the weight parameters f(x) and f(y) are predefined as one look-up-table (LUT) which are determined based on the size and the intra prediction direction of the current CU. Additionally, according to the existing AVS3 design, the InterPF mode is always disabled when the current CU is coded by the MMVD mode.

Although the MMVD mode can efficiently enhance the efficiency of inter prediction, several aspects of its design can still be further improved. Specifically, the following issues in the current MMVD design in the AVS3 standard are identified.

As described earlier, in the MMVD design, the set of allowed MVD offsets that can be selected for one MMVD CU is fixed, which includes ¼-pel (pixel/picture element), ½-pel, 1-pel, 2-pel and 4-pel as illustrated in Table 1. Such design may not be always optimal for video contents with varying characteristics. For example, compared to lower resolution video sequences (like VGA and WQVGA), video sequences with higher resolutions tend to have much larger MVs for inter CUs. Correspondingly, for video sequences with relatively large motions, large MVD offsets are more often selected in MMVD mode than small MVD offsets. Therefore, to maximize the coding gains of the MMVD mode, it is more beneficial to adaptively adjust the allowed MVD offset values according to the specific characteristics of the coded videos.

In the AVS3, the DMVR mode is only applied to the CUs that are coded by the regular merge mode. For the MMVD CUs, the DMVR is always disabled. However, given that the MMVD mode is just one extension of the regular merge mode with signaled MVDs, it could be also beneficial to apply the DMVR to the inter CUs that are coded in MMVD mode. Such combination can further improve the inter prediction efficiency of the MMVD mode without increasing complexity of practical hardware codec design.

As discussed in above, the InterPF mode is always disabled when one current CU is coded by the MMVD mode. However, similar to the regular merge mode, the MVs derived in the MMVD mode may not be as accurate as the MVs derived in the non-merge mode (where the MVs of one inter CU are directly signaled in the bit-stream). In such case, the combination of the inter prediction samples of one MMVD CU with the intra prediction samples from its neighboring reconstructed samples can potentially improve the prediction accuracy and improve the coding efficiency. Based on such analysis, it would be beneficial to allow the combination of the InterPF mode and the MMVD mode.

In some embodiments, methods and systems are implemented to further improve the coding efficiency of the MMVD mode as disclosed herein. Specifically, the main aspects of the implemented methods are summarized as follows.

Signaling methods are used to support the adaptation of the allowed MVD offsets for the MMVD mode at various coding levels. Additionally, one encoder-side method is used to adaptively determine the optimal MVD offsets that are applied to the MMVD mode.

Methods are used in the DMVR process to further refine the MVs of the MMVD mode.

Methods are implemented to enable the combination of the MMVD mode with the InterPF mode.

In some embodiments, an adaptation method of the MVD offset value for the MMVD mode is implemented.

In some MMVD design, the allowed MVD offset values are fixed to be ¼-pel, ½-pel, 1-pel, 2-pel and 4-pel. Such design is suboptimal for video contents with high resolutions or with fierce motion. In those cases, the MVs tend to be much larger such that the above MVD offset values defined in the MMVD mode may not be optimal to capture the real motion of those blocks. To further improve the coding performance of the MMVD mode, the adaptation of the MVD offsets is supported that are allowed to be selected by the MMVD mode.

According to some embodiments, a certain number of MVD offset value sets can be predefined for the MMVD mode, and the selected set of the MVD offsets is allowed to vary from time to time based on the varying motion characteristics of video content. As one example of the disclosure, Table 3 shows two sets of predefined MVD offsets and their corresponding binarization codewords for entropy coding.

TABLE 3

The sets of MVD offsets for the MMVD mode.

| MVD offset set1 | | MVD offset set2 | |
| --- | --- | --- | --- |
| MVD offset | Binarization | MVD offset | Binarization |
| ¼-pel | 1 | 1/4-pel | 000 |
| ½-pel | 01 | 1/2-pel | 001 |
| 1-pel | 001 | 1-pel | 011 |
| 2-pel | 0001 | 2-pel | 010 |
| 4-pel | 0000 | 4-pel | 10 |
| N/A | N/A | 8-pel | 110 |
| N/A | N/A | 16-pel | 1110 |
| N/A | N/A | 32-pel | 1111 |

As can be seen from Table 3, the second set of the MVD offsets is one superset of the first set, with three additional MVD offsets introduced. They are 8-pel, 16-pel and 32-pel. The newly added MVD offsets make the second set more suitable for coding video blocks with large motion. Moreover, in Table 3, different binarization codewords are assigned to each set to accommodate different probability distributions of the MVD offset value usage. For instance, the binarization used for the first set assigns shorter code-words for small MVD offsets, which makes the first set more efficient for coding pictures/regions where the MMVD CUs with small MVD offsets are frequently selected. Likewise, the second MVD offset set is more effective for coding pictures/regions where the MMVD CUs with moderate MVD offset values are frequently selected.

In the above example, only two MVD offset sets are allowed to be selected for the MMVD mode. However, in practice, multiple MVD offset sets (i.e., more than two sets) as well as the corresponding code-words may be derived off-line by the method disclosed herein according to the specific motion characteristics of different video sequences. The encoder may select the best MVD offset set and signal the corresponding index of the selected set to decoder.

According to some embodiments, adaptive selection of the predefined sets of MVD offsets is enabled by signaling one set identifier (or id), to indicate which set is selected. The id can be signaled at different coding levels, e.g., sequence-level, picture-level and/or slice level, while under the signaling level, e.g., at coding block group level and/or coding block level. Only the MVD offsets in the identified set can be selected by the MMVD mode. Assuming the adaptation of the allowed MVD offsets is carried out at picture level, Table 4 shows one exemplar syntax table with the syntax element signaled at picture header.

TABLE 4

The modified syntax table with the MMVD offset control flag

| inter_picture_header( ) { | |
| --- | --- |
| ....... | |
| if (AffineEnableFlag) { | |
|   affine_subblock_size_flag | u(1) |
| } | |
| If(MMVDEnableFlag) { | |
|   mmvd_dist_set_id | u(1) |
| } | |
| next_start_code( ) | |
| } | | mmvd_dist_set_id specifies the set of MVD offsets that are allowed to be selected for the coding blocks that are coded with the MMVD mode in the current picture. For the example shown in Table 3 where two sets are pre-defined, the mmvd_dist_set_id becomes a flag. When the flag takes one value, e.g. 0, it indicates that the allowed MVD offsets for the MMVD mode include ¼-pel, ½-pel, 1-pel, 2-pel and 4-pel. When the flag takes the opposite value, e.g. 1, it indicates that the allowed MVD offsets for the MMVD mode include ¼-pel, ½-pel, 1-pel, 2-pel, 4-pel, 8-pel, 16-pel and 32-pel.

In Table 4, the variable MMVDEnableFlag is one control flag to indicate whether the MMVD tool is enabled or not for the coding blocks in the video sequences. This variable may be controlled through a control flag at sequence level, e.g., in sequence parameter set.

In another embodiment, rather than using fixed MVD offsets, the MVD offset values are signaled directly in the bitstream. This gives the encoder more freedom in determining the desirable MVD offset values for the current picture/slice on-the-fly.

In yet another embodiment, the selection of the set of the MVD offset values is determined based on certain statistics on the fly without explicitly signaling the mmvd_dist_set_id. Such certain statistics may include, but are not limited to, the probability distribution of MVD offset value usage calculated based on a number of previously coded pictures, slices, and/or coding blocks. The selection of the set of the MVD offset values may be re-determined and/or updated at various frequency level. For example, the selection may be re-determined and/or updated every time a CU is coded in MMVD mode. In another example, the selection may be re-determined and/or updated every time there are a number of CUs, e.g. 8, or 16, coded in the MMVD mode. In another example, the selection of the set of the allowed MVD offsets may be updated once after a number of CUs, e. g., 8 or 16, that are coded in inter modes. In such case, the average/maximum/minimum of the MVs of the inter blocks may be calculated and used to determine which set of the MVD offsets should be selected for the following coding blocks that are coded with the MMVD mode. According to such a method, a reset operation of the set selection may be performed at a certain point, e.g. at the beginning of the current frame coding, at the beginning of the current GOP (i.e. group of pictures) coding, or when a frame supporting random access functionality, e.g. an IDR frame (An IDR frame specifies that no frame after the IDR frame can reference any frame before it), is coded, etc., wherein a default set of the MVD offset values is always selected.

In some embodiments, an encoder logic to select optimal MVD offsets for the MMVD mode is implemented. In the MMVD method discussed above, multiple MVD offset sets are allowed to be selected by the MMVD mode. In some examples, one method is provided to adaptively select the optimal MVD offset set at an encoder side. Specifically, given the strong content characteristics correlation between the pictures in the same video sequence, the MVD offsets selected by one inter picture may be very similar to that of its neighboring picture that is coded previously. Based on such consideration, the average MVD offset of the MMVD CUs of the previous coded picture is used to determine the MVD offset set for the MMVD mode in the current picture. Assuming the two sets of the MVD offsets as exemplified in Table 3 are applied to the MMVD mode and there are M (M is a positive integer) CUs that are coded by the MMVD mode in the previous pictures with the MVD offset value $V_0$, $V_1, \ldots, V_{M-1}$, the average MVD offset for MMVD mode in the previous picture is calculated as:

$$\sigma_{avg} = \frac{\sum_{i=0}^{M-1} V_i}{M} \quad (8)$$

Based on (8), the index of the MVD offset set that is used by the current picture is determined as:

$$\text{index} = \begin{cases} 0, & \sigma_{avg} < th \\ 1, & \sigma_{avg} \geq th \end{cases} \quad (9)$$

In some embodiments, the DMVR mode is enabled for the MMVD mode. In the some MMVD designs, the DMVR is always not applied together. However, because the MMVD mode is one extended merge mode with additionally signaled MVD offsets, allowing DMVR on top of MMVD may further improve the precision of the MVs derived by the MMVD mode. Additionally, the combination of the two coding tools does not incur additional codec implementation complexity for hardware/software. Based on such consideration, two methods/embodiments are implemented in the following to enable the application of the DMVR process for the MMVD mode.

In the first embodiment, DMVR is applied to refine all the MVs derived by the MMVD mode as long as the initial MVs derived by the MMVD mode are bi-directional and satisfy the common conditions for triggering the DMVR process.

In the second embodiment, the DMVR is only applied to the MMVD CUs when the signaled MMVD offset is larger than one threshold. When the corresponding MMVD offset is equal to or smaller than the threshold, the DMVR is always bypassed. In practice, to maximize the coding performance, different thresholds may be applied according to the specific characteristic of coded videos. In one example, fixed threshold (e.g., 1-pel) is used. In another embodiment, the encoder adaptively determines the optimal threshold and signals to the decoder at various coding levels, e.g., sequence level, picture level, slice level and/or coding block level, and so forth.

In practice, the second embodiment discussed above may provide better coding performance than the first embodiment. Based on the existing DMVR design, its search range is +/−2-pel from the initial MVs. But, as shown before, the allowed MVD offsets used by the MMVD mode can also cover such search range, and the selection of the MVD offset in MMVD is based on the more accurate and reliable rate-distortion optimization (RDO) at encoder-side rather than the decoder-side bilateral-matching search as in the DMVR. As a result, within the small local region around the initial MVs, the MVD offset signaled by the MMVD should be more accurate than that of the DMVR. Disallowing DMVR for this case may reduce signaling overhead and improve coding efficiency.

In some embodiments, the InterPF is enabled for the MMVD mode. As discussed above, the InterPF mode does not allow its inter prediction samples to come from the MMVD mode. However, similar to the regular merge mode, the MVs derived by the MMVD mode may not be accurate. For example, when such case happens, there may be undesirable discontinuities between the inter prediction samples of the current block and its neighboring reconstructed samples, which could cause visible blocking artifacts along the boundaries of the neighboring blocks. In such case, the combination of the inter prediction samples of one MMVD CU with the intra prediction samples from its neighboring reconstructed samples can potentially reduce such artifact and improve the prediction efficiency. Meanwhile, there is no complexity increase for hardware/software codec implementation in enabling the combination of the two coding tools. Based on such consideration, in one embodiment, the InterPF mode is enabled for the MMVD CUs, i.e., enabling the combination of the inter prediction samples of one MMVD CU with the intra prediction samples from the neighboring reconstructed samples of the CU. Specifically, taking the InterPF design as an example (as shown in equations (6) and (7)), when such combination is enabled, one first control flag will be received at the decoder to indicate whether the MMVD mode is applied to one coding unit or not. In case the MMVD is enabled for the coding unit, one second control flag will be received at the decoder to further specify if the InterPF mode is further applied to the MMVD coding unit. If the second control flag is one/ enabled, one third control flag will be signaled for choosing one of the two InterPF filters (as shown in equations (6) and (7)) for the CU.

Figure 8:
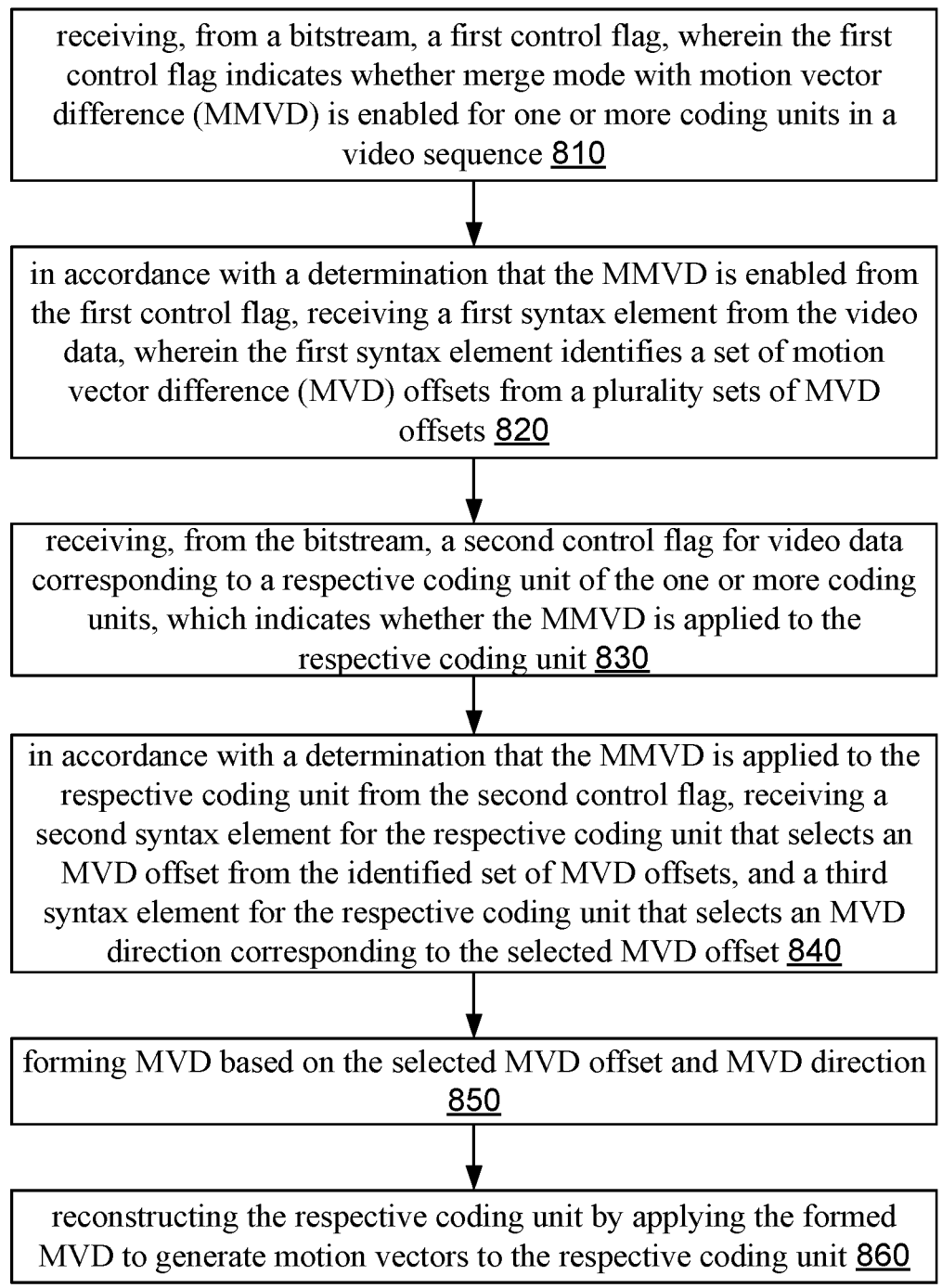
FIG. 8 is a flowchart illustrating an exemplary process of determining a motion vector difference (MVD) offset from a plurality sets of MVD offsets when the merge mode with motion vector difference (MMVD) is enabled in accordance with some implementations of the present disclosure.

FIG. 8 is a flowchart illustrating an exemplary process 800 of determining a motion vector difference (MVD) offset from a plurality sets of MVD offsets when the merge mode with motion vector difference (MMVD) is enabled in accordance with some implementations of the present disclosure.

The video decoder 30 receives, from the bitstream, a first control flag, wherein the first control flag indicates whether merge mode with motion vector difference (MMVD) is enabled for one or more coding units in a video sequence (810). In some embodiments, the first control flag is equal to one when MMVD is enabled for one or more coding units in a video sequence.

In accordance with a determination that the MMVD is enabled from the first control flag, the video decoder 30 receives a first syntax element from the video data, wherein the first syntax element identifies a set of motion vector difference (MVD) offsets from a plurality sets of MVD offsets (820).

The video decoder 30 receives, from the bitstream, a second control flag for video data corresponding to a respective coding unit of the one or more coding units, which indicates whether the MMVD is applied to the respective coding unit (830). In some embodiments, the second control flag is equal to one when the MMVD is applied to the respective coding unit.

In accordance with a determination that the MMVD is applied to the respective coding unit from the second control flag, the video decoder 30 receives a second syntax element for the respective coding unit that selects an MVD offset from the identified set of MVD offsets, and a third syntax element for the respective coding unit that selects an MVD direction corresponding to the selected MVD offset (840).

The video decoder 30 forms the MVD based on the selected MVD offset and MVD direction (850).

The video decoder 30 reconstructs the respective coding unit by applying the formed MVD to generate the motion vectors to the respective coding unit (860).

In some embodiments, the plurality sets of MVD offsets include a first set of MVD offsets and a second set of MVD offsets.

In some embodiments, the first set of MVD offsets is a subset of the second set of MVD offsets.

In some embodiments, a first set of binarization codewords is assigned to the first set of MVD offsets, and a second set of binarization codewords is assigned to the second set of MVD offsets. In some embodiments, the first set of binarization codewords is different from the second set of binarization codewords for one same offset value to accommodate different probability distributions of MVD offset value usage.

In some embodiments, the first set of MVD offsets includes offset values (in unit of sample) of ¼, ½, 1, 2, 4 and the second set of MVD offsets includes offset values (in unit of sample) of ¼, ½, 1, 2, 4, 8, 16, and 32.

In some embodiments, the first set of MVD offsets includes offset values (in unit of sample) of ¼, ½, 1, 2, 4 and their corresponding binarization codewords of 1, 01, 001, 0001 and 0000 respectively, and the second set of MVD offsets includes offset values (in unit of sample) of ¼, ½, 1, 2, 4, 8, 16, and 32 and their corresponding binarization codewords of 000, 001, 011, 010, 10, 110, 1110, and 1111 respectively.

In some embodiments, the first syntax element is signaled at one or more of different coding levels including sequence-level, picture-level and slice level.

In another aspect, a process of combining the InterPF mode and the MMVD mode is disclosed as follows.

The video decoder 30 receives, from a bitstream, a first control flag, wherein the first control flag indicates whether merge mode with motion vector difference (MMVD) is enabled for one or more coding units. In some embodiments, the first control flag is equal to one when MMVD is enabled for one or more coding units in a video sequence.

In accordance with a determination that the MMVD is enabled from the first control flag, the video decoder 30 receives, from the bitstream, a second control flag for video data corresponding to a respective coding unit of the one or more coding units, which indicates whether the MMVD is applied to the respective coding unit. In some embodiments, the second control flag is equal to one when the MMVD is applied to the respective coding unit.

In accordance with a determination that the MMVD is applied to the respective coding unit from the second control flag, the video decoder 30 receives a third control flag from the video data, wherein the third control flag indicates whether inter prediction filter (InterPF) mode is enabled for the respective coding unit. In some embodiments, the third control flag is equal to one when the InterPF mode is enabled for the respective coding unit.

In accordance with a determination that the InterPF mode is enabled for the respective coding unit from the third control flag, the video decoder 30 receives a fourth syntax element from the video data, wherein the fourth syntax element identifies an InterPF mode from a plurality of InterPF modes for the respective coding unit.

The video decoder 30 receives reconstructs the respective coding unit by applying the MMVD and the identified InterPF mode to the video data corresponding to the respective coding unit.

In some embodiments, the plurality of InterPF modes include at least two InterPF modes.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

The terminology used in the description of the implementations herein is for the purpose of describing particular implementations only and is not intended to limit the scope of claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the implementations. The first electrode and the second electrode are both electrodes, but they are not the same electrode.

Reference throughout this specification to "one example," "an example," "exemplary example," or the like in the singular or plural means that one or more particular features, structures, or characteristics described in connection with an example is included in at least one example of the present disclosure. Thus, the appearances of the phrases "in one example" or "in an example," "in an exemplary example," or the like in the singular or plural in various places throughout this specification are not necessarily all referring to the same example. Furthermore, the particular features, structures, or characteristics in one or more examples may include combined in any suitable manner.

The description of the present application has been presented for purposes of illustration and description, and is not intended to be exhaustive or limited to the invention in the form disclosed. Many modifications, variations, and alternative implementations will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various implementations and to best utilize the underlying principles and various implementations with various modifications as are suited to the particular use contemplated. Therefore, it is to be understood that the scope of claims is not to be limited to the specific examples of the implementations disclosed and that modifications and other implementations are intended to be included within the scope of the appended claims.

What is claimed is:

1. A method of decoding video data, comprising:
   receiving, from a bitstream, a first control flag, wherein the first control flag indicates whether merge mode with motion vector difference (MMVD) is enabled for one or more coding units in a video sequence; and
   in accordance with a determination that the MMVD is enabled from the first control flag,
      receiving a first syntax element from the video data, wherein the first syntax element identifies a set of motion vector difference (MVD) offsets from a plurality sets of MVD offsets, wherein the plurality sets of MVD offsets comprise a first set of MVD offsets and a second set of MVD offsets, wherein a first set of binarization codewords is assigned to the first set of MVD offsets, and a second set of binarization codewords is assigned to the second set of MVD offsets, and wherein a codeword for an offset value in the first set of binarization codewords is different from a codeword for the offset value in the second set of binarization codewords;
      determining, from the bitstream, a second control flag for video data corresponding to a respective coding unit of the one or more coding units, which indicates whether the MMVD is applied to the respective coding unit; and
   in accordance with a determination that the MMVD is applied to the respective coding unit from the second control flag,
      receiving a second syntax element for the respective coding unit that selects an MVD offset from the identified set of MVD offsets, and a third syntax element for the respective coding unit that selects an MVD direction corresponding to the selected MVD offset; and
      reconstructing the respective coding unit by applying the selected MVD offset and MVD direction to generate motion vectors to for the respective coding unit.

2. The method according to claim 1, wherein the first set of MVD offsets is a subset of the second set of MVD offsets.

3. The method according to claim 1, wherein the first set of MVD offsets includes offset values in unit of sample, of ¼, ½, 1, 2, 4.

4. The method according to claim 1, wherein the second set of MVD offsets includes offset values in unit of sample, of ¼, ½, 1, 2, 4, 8, 16, and 32.

5. The method according to claim 1, wherein the first set of MVD offsets includes offset values in unit of sample, of ¼, ½, 1, 2, 4 and their corresponding binarization codewords of 1, 01, 001, 0001 and 0000 respectively.

6. The method according to claim 1, wherein the second set of MVD offsets includes offset values in unit of sample, of ¼, ½, 1, 2, 4, 8, 16, and 32 and their corresponding binarization codewords of 000, 001, 011, 010, 10, 110, 1110, and 1111 respectively.

7. The method according to claim 1, wherein the first syntax element is signaled at one or more of different coding levels including sequence-level, picture-level and slice level.

8. The method according to claim 1, wherein the first control flag is equal to 1 when the MMVD is enabled.

9. An electronic apparatus comprising:
   one or more processing units;
   memory coupled to the one or more processing units; and
   a plurality of programs stored in the memory that, when executed by the one or more processing units, cause the electronic apparatus to perform acts including:
      receiving, from a bitstream, a first control flag, wherein the first control flag indicates whether merge mode with motion vector difference (MMVD) is enabled for one or more coding units in a video sequence; and
      in accordance with a determination that the MMVD is enabled from the first control flag,
         receiving a first syntax element from the video data, wherein the first syntax element identifies a set of motion vector difference (MVD) offsets from a plurality sets of MVD offsets, wherein the plurality sets of MVD offsets comprise a first set of MVD offsets and a second set of MVD offsets, wherein a first set of binarization codewords is assigned to the first set of MVD offsets, and a second set of binarization codewords is assigned to the second set of MVD offsets, and wherein a codeword for an offset value in the first set of binarization codewords is different from a codeword for the offset value in the second set of binarization codewords;
         determining, from the bitstream, a second control flag for video data corresponding to a respective coding unit of the one or more coding units, which indicates whether the MMVD is applied to the respective coding unit; and in accordance with a determination that the MMVD is applied to the respective coding unit from the second control flag, receiving a second syntax element for the respective coding unit that selects an MVD offset from the identified set of MVD offsets, and a third syntax element for the respective coding unit that selects an MVD direction corresponding to the selected MVD offset; and reconstructing the respective coding unit by applying the selected MVD offset and MVD direction to generate motion vectors for the respective coding unit.

10. The electronic apparatus according to claim 9, wherein the first set of MVD offsets is a subset of the second set of MVD offsets.

11. The electronic apparatus according to claim 9, wherein the first set of MVD offsets includes offset values in unit of sample, of ¼, ½, 1, 2, 4.

12. The electronic apparatus according to claim 9, wherein the second set of MVD offsets includes offset value in unit of sample, of ¼, ½, 1, 2, 4, 8, 16, and 32.

13. The electronic apparatus according to claim 9, wherein the first set of MVD offsets includes offset values in unit of sample, of ¼, ½, 1, 2, 4 and their corresponding binarization codewords of 1, 01, 001, 0001 and 0000 respectively.

14. The electronic apparatus according to claim 9, wherein the second set of MVD offsets includes offset values in unit of sample, of ¼, ½, 1, 2, 4, 8, 16, and 32 and their corresponding binarization codewords of 000, 001, 011, 010, 10, 110, 1110, and 1111 respectively.

15. The electronic apparatus according to claim 9, wherein the first syntax element is signaled at one or more of different coding levels including sequence-level, picture-level and slice level.

16. A non-transitory computer readable storage medium storing computer executable instructions, which when executed by one or more processors, enable the one or more processors to, individually or collectively, implement a method of decoding video data comprising:

receiving, from a bitstream to be decoded, a first control flag, wherein the first control flag indicates whether merge mode with motion vector difference (MMVD) is enabled for one or more coding units in a video sequence; and in accordance with a determination that the MMVD is enabled from the first control flag, receiving a first syntax element from the video data, wherein the first syntax element identifies a set of motion vector difference (MVD) offsets from a plurality sets of MVD offsets, wherein the plurality sets of MVD offsets comprise a first set of MVD offsets and a second set of MVD offsets wherein a first set of binarization codewords is assigned to the first set of MVD offsets, and a second set of binarization codewords is assigned to the second set of MVD offsets, and wherein a codeword for an offset value in the first set of binarization codewords is different from a codeword for the offset value in the second set of binarization codewords;

determining, from the bitstream, a second control flag for video data corresponding to a respective coding unit of the one or more coding units, which indicates whether the MMVD is applied to the respective coding unit; and in accordance with a determination that the MMVD is applied to the respective coding unit from the second control flag, receiving a second syntax element for the respective coding unit that selects an MVD offset from the identified set of MVD offsets, and a third syntax element for the respective coding unit that selects an MVD direction corresponding to the selected MVD offset; and reconstructing the respective coding unit by applying the selected MVD offset and MVD direction to generate motion vectors for the respective coding unit.

\* \* \* \* \*